(12) United States Patent
Lukens et al.

(10) Patent No.: US 12,095,628 B2
(45) Date of Patent: Sep. 17, 2024

(54) MACHINE LEARNING SYSTEM FOR PREDICTING NETWORK ABNORMALITIES

(71) Applicant: T-Mobile USA, Inc., Bellevue, WA (US)

(72) Inventors: Lance Paul Lukens, Templeton, CA (US); Wei Huang, Bellevue, WA (US); Anandajothi Muttayane, Renton, WA (US); Anselmo Myungsup Shim, Bellevue, WA (US); Vikas Ranjan, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 17/969,611

(22) Filed: Oct. 19, 2022

(65) Prior Publication Data

US 2024/0137285 A1 Apr. 25, 2024
US 2024/0235951 A9 Jul. 11, 2024

(51) Int. Cl.
*H04L 41/16* (2022.01)
*H04L 41/50* (2022.01)
*H04L 41/5009* (2022.01)

(52) U.S. Cl.
CPC .......... *H04L 41/16* (2013.01); *H04L 41/5009* (2013.01); *H04L 41/5032* (2013.01)

(58) Field of Classification Search
CPC .. H04L 41/16; H04L 41/5009; H04L 41/5032
See application file for complete search history.

(56) References Cited

U.S. PATENT DOCUMENTS

| | | | |
|---|---|---|---|
| 6,304,640 B1 | 10/2001 | Darland et al. |
| 6,359,976 B1 | 3/2002 | Kalyanpur et al. |
| 6,381,306 B1 | 4/2002 | Lawson et al. |
| 6,411,681 B1 | 6/2002 | Nolting et al. |
| 6,714,979 B1 | 3/2004 | Brandt et al. |
| 6,718,023 B1 | 4/2004 | Zolotov |
| 6,731,730 B1 | 5/2004 | Zolotov |
| 6,744,866 B1 | 6/2004 | Nolting et al. |
| 7,027,574 B2 | 4/2006 | Nolting |
| 7,054,431 B2 | 5/2006 | Fleischer et al. |
| 7,062,024 B2 | 6/2006 | Kreckel et al. |
| 7,190,772 B2 | 3/2007 | Moisey et al. |
| 7,231,024 B2 | 6/2007 | Moisey et al. |
| 7,263,180 B2 | 8/2007 | Kreckel et al. |
| 7,324,634 B2 | 1/2008 | Hoy et al. |

(Continued)

FOREIGN PATENT DOCUMENTS

| | | |
|---|---|---|
| CN | 101877872 A | 11/2010 |
| CN | 101925101 A | 12/2010 |

(Continued)

*Primary Examiner* — Joseph L Greene
(74) *Attorney, Agent, or Firm* — Perkins Coie LLP

(57) ABSTRACT

A machine learning system automatically diagnoses and resolves issues in a telecommunications network. When a customer reports a network issue using a mobile application, the device performs a diagnostic test, such as a speed test. In addition, network logs or performance metrics during occurrence of the network issue are collected. The results of the diagnostic are used as inputs to a machine learning model in combination with the network logs or metrics to predict the cause of the network issue or to perform a corrective action.

15 Claims, 10 Drawing Sheets

(56) References Cited

U.S. PATENT DOCUMENTS

| | | | |
|---|---|---|---|
| 7,640,015 B2 | 12/2009 | Connelly et al. | |
| 8,077,675 B2 | 12/2011 | Stephenson et al. | |
| 8,150,006 B2 | 4/2012 | Dowens et al. | |
| 8,161,080 B2 | 4/2012 | Gallant | |
| 8,270,579 B2 | 9/2012 | Kung et al. | |
| 8,406,398 B2 | 3/2013 | Gore | |
| 8,477,637 B1 | 7/2013 | Lang et al. | |
| 8,755,499 B2 | 6/2014 | Kung et al. | |
| 9,232,420 B1* | 1/2016 | Akiti | H04W 24/04 |
| 9,253,333 B1 | 2/2016 | Cowick | |
| 9,277,431 B1 | 3/2016 | Podolsky | |
| 9,497,648 B2 | 11/2016 | Gupta et al. | |
| 9,660,862 B2 | 5/2017 | Ko et al. | |
| 9,723,153 B2 | 8/2017 | Garg et al. | |
| 9,723,441 B2 | 8/2017 | Dong et al. | |
| 9,723,502 B2 | 8/2017 | Gupta et al. | |
| 9,729,727 B1 | 8/2017 | Zhang | |
| 9,749,840 B1 | 8/2017 | Damle et al. | |
| 9,763,220 B2 | 9/2017 | Gupta et al. | |
| 9,894,559 B2 | 2/2018 | Ko et al. | |
| 9,955,024 B2 | 4/2018 | Caldwell et al. | |
| 10,063,406 B2 | 8/2018 | Tapia et al. | |
| 10,091,679 B1 | 10/2018 | Munar et al. | |
| 10,111,121 B2 | 10/2018 | Ko et al. | |
| 10,339,456 B2 | 7/2019 | Hui et al. | |
| 10,477,032 B2 | 11/2019 | Kovács et al. | |
| 10,674,388 B2 | 6/2020 | Tapia et al. | |
| 10,904,398 B1 | 1/2021 | Kumar et al. | |
| 10,965,807 B2 | 3/2021 | Côté et al. | |
| 11,018,958 B2 | 5/2021 | Tapia | |
| 11,025,782 B2* | 6/2021 | Boussac | H04W 4/24 |
| 11,252,052 B1* | 2/2022 | Babu Balasubramani | H04L 41/0654 |
| 11,271,796 B2 | 3/2022 | Tapia et al. | |
| 11,303,760 B2 | 4/2022 | Shah | |
| 2003/0009463 A1 | 1/2003 | Gallant | |
| 2005/0287983 A1 | 12/2005 | Armanino et al. | |
| 2008/0019493 A1 | 1/2008 | Kreckel et al. | |
| 2008/0212573 A1 | 9/2008 | Noldus et al. | |
| 2009/0075648 A1* | 3/2009 | Reed | H04W 24/02 455/424 |
| 2009/0304165 A1 | 12/2009 | Chung et al. | |
| 2009/0316596 A1 | 12/2009 | Croak et al. | |
| 2010/0104079 A1 | 4/2010 | Croak et al. | |
| 2011/0122773 A1 | 5/2011 | Kung et al. | |
| 2011/0141921 A1* | 6/2011 | Reese | H04L 41/0677 370/252 |
| 2011/0158395 A1 | 6/2011 | Farel et al. | |
| 2011/0184961 A1 | 7/2011 | Aertebjerg et al. | |
| 2012/0284080 A1 | 11/2012 | De Oliveira et al. | |
| 2015/0310336 A1 | 10/2015 | Sotela et al. | |
| 2016/0135067 A1 | 5/2016 | Morad et al. | |
| 2017/0078171 A1 | 3/2017 | Tapia et al. | |
| 2017/0126883 A1 | 5/2017 | Rodriguez et al. | |
| 2017/0149626 A1* | 5/2017 | Yoon | H04L 41/0631 |
| 2018/0131810 A1 | 5/2018 | Yokel | |
| 2019/0374103 A1* | 12/2019 | Hresko | G16H 40/63 |
| 2020/0304364 A1* | 9/2020 | Tapia | G06N 7/01 |
| 2021/0105364 A1 | 4/2021 | Kumar et al. | |
| 2022/0147863 A1 | 5/2022 | Chawla et al. | |
| 2022/0248250 A1 | 8/2022 | Saluja et al. | |

FOREIGN PATENT DOCUMENTS

| | | |
|---|---|---|
| CN | 1901543 B | 8/2012 |
| CN | 102131017 B | 4/2014 |
| CN | 104813353 A | 7/2015 |
| CN | 103037110 B | 4/2017 |
| CN | 103493458 B | 5/2017 |
| CN | 107534879 B | 2/2021 |
| CN | 110036623 B | 6/2021 |
| EP | 0860076 A1 | 8/1998 |
| EP | 1212898 B1 | 12/2005 |
| EP | 2321929 A1 | 5/2011 |
| EP | 2950514 A1 | 12/2015 |
| EP | 3091764 B1 | 10/2017 |
| EP | 3342146 A1 | 7/2018 |
| EP | 3465459 A1 | 4/2019 |
| EP | 3324607 B1 | 11/2019 |
| EP | 3668014 B1 | 3/2022 |
| JP | H09511366 A | 11/1997 |
| JP | 2000500311 A | 1/2000 |
| JP | 4652401 B2 | 12/2010 |
| JP | 2016507794 A | 3/2016 |
| JP | 2018521524 A | 8/2018 |
| JP | 2019521427 A | 7/2019 |
| JP | 2020102211 A | 7/2020 |
| KR | 100648452 B1 | 11/2006 |
| KR | 20210023284 A | 3/2021 |
| WO | 9717796 A1 | 5/1997 |
| WO | 0120920 A1 | 3/2001 |
| WO | 0213497 A1 | 2/2002 |
| WO | 2004077799 A2 | 9/2004 |
| WO | 2008139454 A1 | 11/2008 |
| WO | 2010020246 A1 | 2/2010 |
| WO | 2015005962 A1 | 1/2015 |
| WO | 2015196812 A1 | 12/2015 |
| WO | 2016075693 A1 | 5/2016 |
| WO | 2016090841 A1 | 6/2016 |
| WO | 2016179484 A1 | 11/2016 |
| WO | 2017037598 A1 | 3/2017 |
| WO | 2017214271 A1 | 12/2017 |
| WO | 2018085696 A2 | 5/2018 |
| WO | 2018169894 A1 | 9/2018 |
| WO | 2021033851 A1 | 2/2021 |

* cited by examiner

MACHINE LEARNING SYSTEM FOR PREDICTING NETWORK ABNORMALITIES

BACKGROUND

Telecommunications networks continue to advance, improving in speed and in the number of users and devices that the networks can handle. But as the number of users increases, so does reliance on these networks for a variety of applications. Furthermore, telecommunications networks are becoming increasingly complex. Accordingly, devices on a telecommunications network can experience connectivity issues for a wide variety of reasons. For instance, causes of network issues include device failure, weather, cyber-attacks, network congestion, and more. Issues can occur at the individual device level, at the local area network (LAN) level, at the metropolitan level, and beyond. Therefore, it is crucial that systems are in place to ensure reliability and to quickly identify and fix issues with the network.

Fault management systems include a set of functions that detect, isolate, and correct malfunctions in a telecommunications network. These functions include compensating for environmental changes, maintaining and examining error logs, accepting and acting on error detection notifications, tracing and identifying faults, carrying out sequences of diagnostics tests, correcting faults, reporting error conditions, and localizing and tracing faults by examining and manipulating database information.

BRIEF DESCRIPTION OF THE DRAWINGS

Detailed descriptions of implementations of the present invention will be described and explained through the use of the accompanying drawings.

Figure 1:
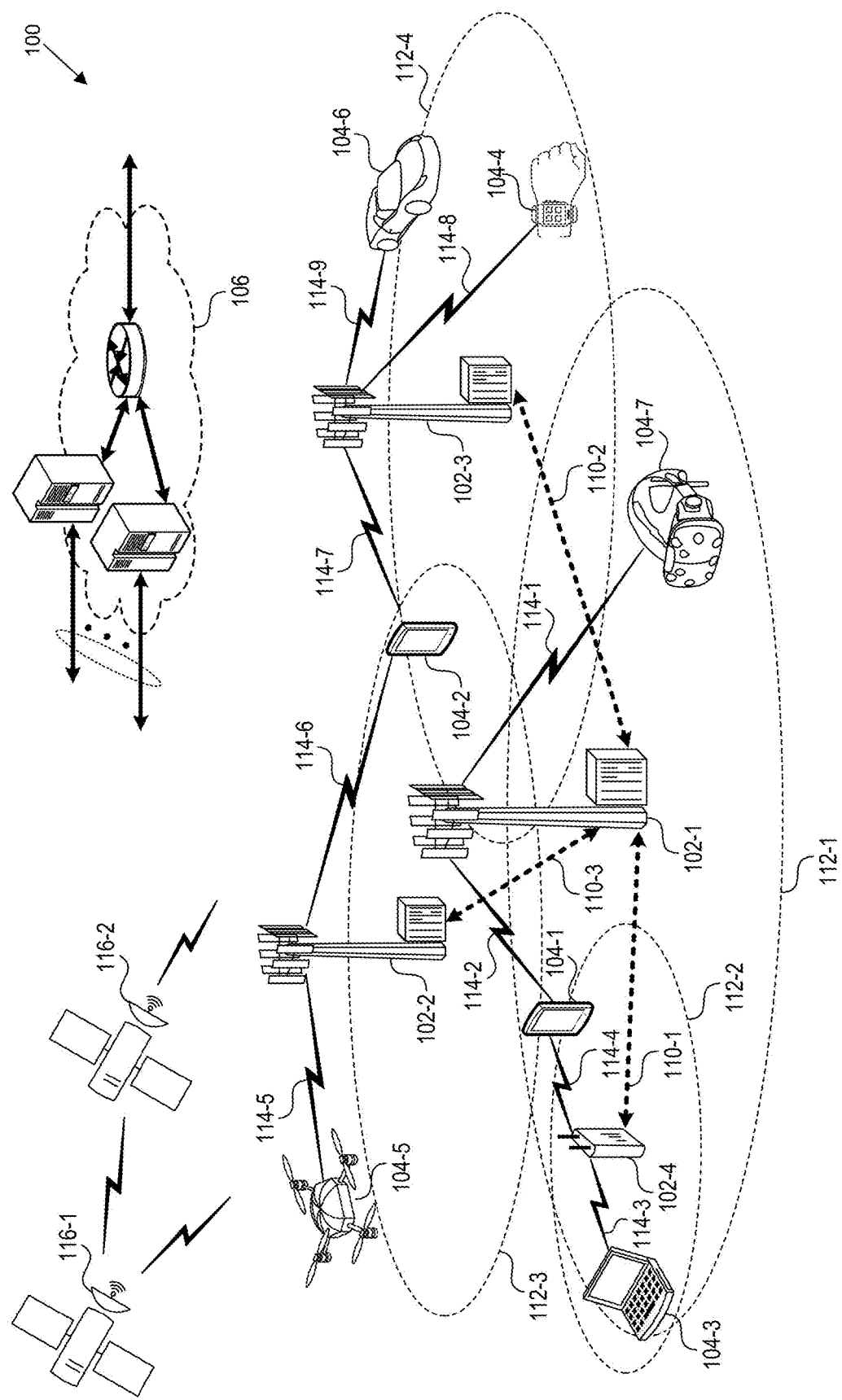
FIG. 1 is a block diagram that illustrates a wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The disclosed technology relates to using machine learning to automatically diagnose and resolve issues in a telecommunications network. Telecommunications providers often rely on customer reporting to detect and resolve network abnormalities. For example, customers can call or message a customer service line to report an issue and contact a customer service representative. The representative can then assist the customer to resolve the issue or escalate the report.

However, it is often impossible to accurately determine the causes of network issues by using customer reports. First, customer reports do not include sufficient information, as customers may lack technical knowledge, and device-specific log data is generally not included in customer reporting. In addition, customer reporting is a slow process that requires multiple channels of communication. The latency of the reporting process causes a disconnect between the time the network issue occurs and the time a customer reports the issue, making it difficult for the network provider to investigate the cause. Thus, systems are needed to improve correlation between a network abnormality and the subsequent reporting of that abnormality. Furthermore, systems are needed to improve the information being reported and then use that information to diagnose causes.

The disclosed technology addresses these issues. A machine learning model is trained using a unique datapoint signature to correlate customer error reports with network data collected during a time period proximate to the report. These network data are supplemented with device-specific information collected through a mobile application on the customer's device. For example, when a customer reports a network issue using the mobile application, the device can be prompted to perform a speed test. The results of the speed test are then used as inputs to the machine learning model in combination with the network data to predict a cause of the network issue or to perform a corrective action.

The unique datapoint signature includes an enhanced call detail record (CDR) based on the network's existing CDR. A CDR is a data record produced by a telephone exchange or other telecommunications equipment that documents the details of a telephone call or other telecommunications transactions (e.g., text message). A CDR contains data fields that describe a specific instance of a telecommunication, such as phone numbers of both the calling and receiving parties, the start time, duration, record number, additional digits used to route the call, results of the call (e.g., whether or not the call was connected), or call type. Although CDRs are typically used by telephone service providers for the production of revenue, the information is not used to diagnose network faults due to lack of detail.

The disclosed technology improves existing CDRs by supplementing the CDRs with various data from the network, such as key performance indicators (KPIs) or network traces, to produce an enhanced CDR. The machine learning model is trained using these enhanced CDRs as training data. Once trained, the machine learning model can be applied to non-enhanced CDRs to predict causes of network issues and automatically perform corrective actions. The results can then be used to further improve the machine learning model. For example, the customer can provide feedback on the model's predictions using the same mobile application used to report the network issue. As the machine learning model improves in its ability to detect and resolve issues in the network, so too does network performance. Furthermore, the machine learning model can be applied to proactively detect and resolve network issues without relying on customer reporting, reducing downtime and further improving network performance.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the system 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provides data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or Time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites such as satellites 116-1 and 116-2 to deliver services anywhere and anytime and provide coverage in areas that are unreachable by any conventional Terrestrial Network (TN). A 6G implementation of the network 100 can support terahertz (THz) communications. This can support wireless applications that demand ultrahigh quality of service requirements and multi-terabits per second data transmission in the 6G and beyond era, such as terabit-per-second backhaul systems, ultrahigh-definition content streaming among mobile devices, AR/VR, and wireless high-bandwidth secure communications. In another example of 6G, the network 100 can implement a converged Radio Access Network (RAN) and Core architecture to achieve Control and User Plane Separation (CUPS) and achieve extremely low User Plane latency. In yet another example of 6G, the network 100 can implement a converged Wi-Fi and Core architecture to increase and improve indoor coverage.

5G Core Network Functions

Figure 2:
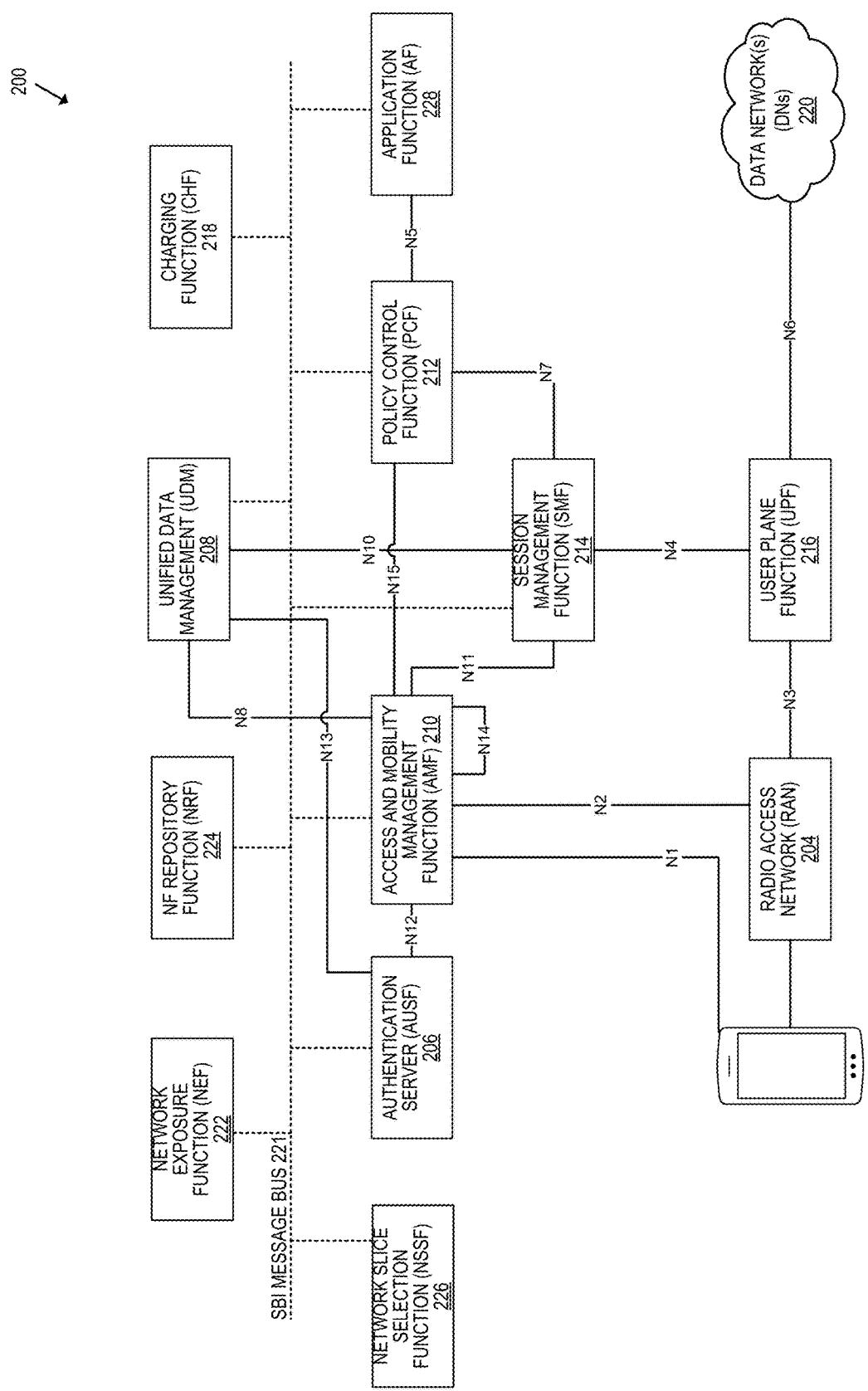
FIG. 2 is a block diagram that illustrates 5G core network functions (NFs) that can implement aspects of the present technology.

FIG. 2 is a block diagram that illustrates an architecture 200 including 5G core network functions (NFs) that can implement aspects of the present technology. A wireless device 202 can access the 5G network through a NAN (e.g., gNB) of a RAN 204. The NFs include an Authentication Server Function (AUSF) 206, a Unified Data Management (UDM) 208, an Access and Mobility management Function (AMF) 210, a Policy Control Function (PCF) 212, a Session Management Function (SMF) 214, a User Plane Function (UPF) 216, and a Charging Function (CHF) 218.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNS) 220. The UPF 216 can be deployed separately from control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, a NF Repository Function (NRF) 224 a Network Slice Selection Function (NSSF) 226, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has pre-determined capabilities, traffic characteristics, service-level agreements, and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 208 can contain voluminous amounts of data that is accessed for authentication. Thus, the UDM 208 is analogous to a Home Subscriber Server (HSS), to provide authentication credentials while being employed by the AMF 210 and SMF 214 to retrieve subscriber data and context.

The PCF 212 can connect with one or more application functions (AFs) 228. The PCF 212 supports a unified policy framework within the 5G infrastructure for governing network behavior. The PCF 212 accesses the subscription information required to make policy decisions from the UDM 208, and then provides the appropriate policy rules to the control plane functions so that they can enforce them. The SCP (not shown) provides a highly distributed multi-access edge compute cloud environment and a single point of entry for a cluster of network functions, once they have been successfully discovered by the NRF 224. This allows the SCP to become the delegated discovery point in a datacenter, offloading the NRF 224 from distributed service meshes that make-up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface and the N11 interface between the AMF 210 and the SMF 214 assigned by the NRF 224, use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework which, along with the more typical QoS and charging rules, includes Network Slice selection, which is regulated by the NSSF 226.

Detection of Network Issues

Figure 3:
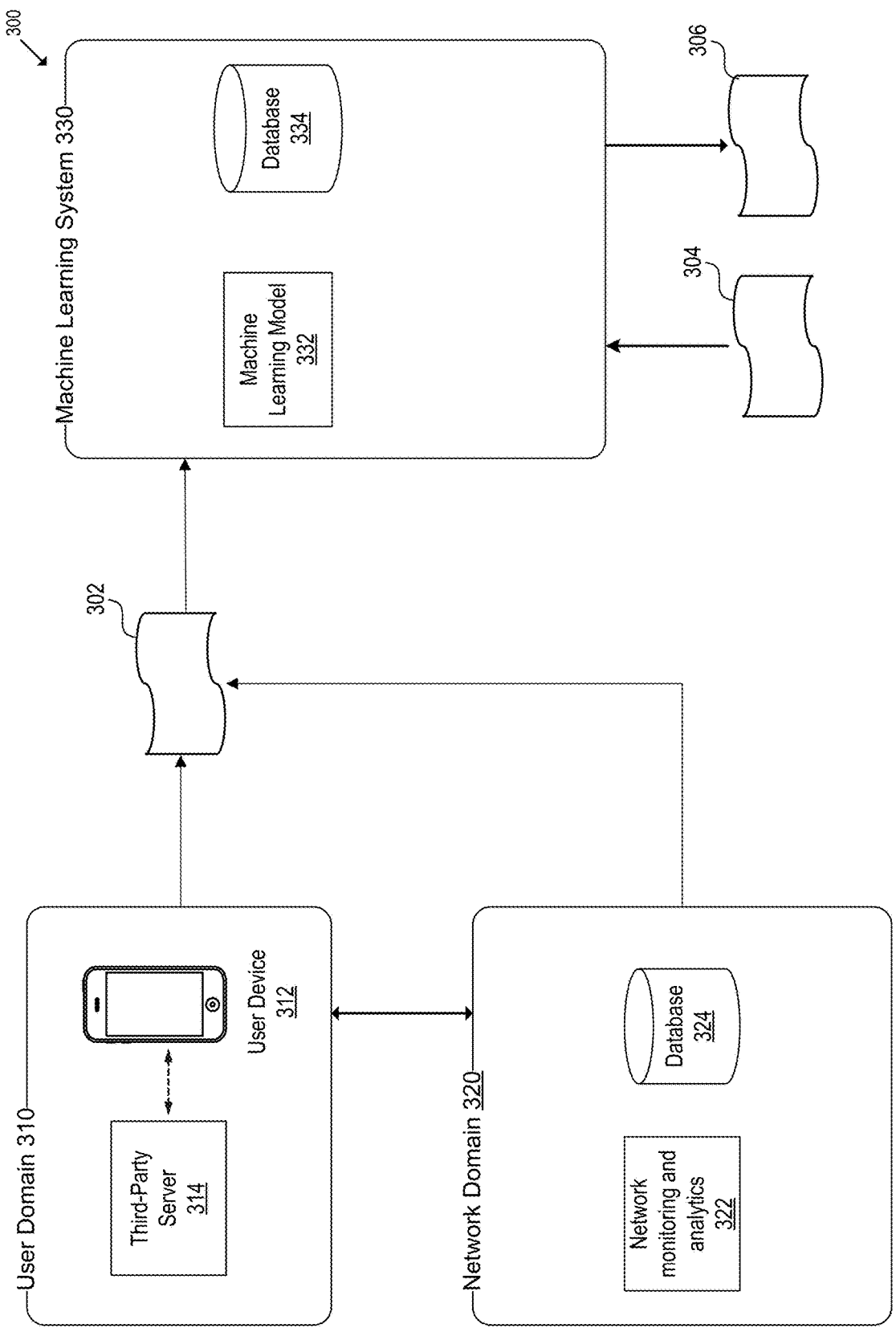
FIG. 3 is a block diagram that illustrates a system for detection of network issues using a machine learning model.

FIG. 3 is a block diagram that illustrates a system 300 for detection of network issues using a machine learning model. The architecture of the system 300 includes a user domain 310, a network domain 320, and a machine learning system 330. A user device 312 in the user domain 310 is served by a telecommunications network operated by equipment in the network domain 320. The network domain 320 can include various components such as a database 324, servers, routers, cell towers, sectors, antennas, software applications, etc., that are used to operate the telecommunications network. For instance, the network domain 320 can include the base stations 102-1 to 102-3 of FIG. 1 and core network components of the architecture 200 of FIG. 2. The user device 312 in the user domain 310 can be a mobile phone, computer, wearable device, etc., such as any of the wireless devices 104-1 to 104-7 shown in FIG. 1.

The machine learning system 330 includes a database 334 and a machine learning model 332 that generates predictions 340 relating to issues the telecommunications network. Network issues are also referred to in this document as network "faults" or "abnormalities." Note that network issues can refer to problems in both the network domain 320 or the user domain 310. For example, network issues include slow speed, lack of coverage, dropped calls, poor audio quality, and video playback errors, which can be attributed to problems with the network or with user device 312.

The machine learning system 330 can be implemented as a cloud service separate from the network domain 320, for example using Microsoft Azure®. In some implementations, the machine learning system is locally operated by the network provider within the network domain 320.

A "model," as used herein, can refer to a construct that is trained using training data to make predictions or provide probabilities for new data items, whether or not the new data items were included in the training data. For example, training data for supervised learning can include items with various parameters and an assigned classification. A new data item can have parameters that a model can use to assign a classification to the new data item. As another example, a model can be a probability distribution resulting from the analysis of training data, such as a likelihood of an n-gram occurring in a given language based on an analysis of a large corpus from that language. Examples of models include neural networks, support vector machines, decision trees, Parzen windows, Bayes, clustering, reinforcement learning, probability distributions, decision trees, decision tree forests, and others. Models can be configured for various situations, data types, sources, and output formats.

In some implementations, the machine learning model 332 is a neural network with multiple input nodes that receive data relating to a state of the telecommunications network or the user device 312 proximate to occurrence of a network issue. The input nodes can correspond to functions that receive the input and produce results. These results can be provided to one or more levels of intermediate nodes that each produce further results based on a combination of lower-level node results. A weighting factor can be applied to the output of each node before the result is passed to the next layer node. At a final layer, ("the output layer") one or more nodes can produce a value classifying the input that, once the model is trained, can be used to predict a cause of the network issue. In some implementations, such neural networks, known as deep neural networks, can have multiple layers of intermediate nodes with different configurations, can be a combination of models that receive different parts of the input and/or input from other parts of the deep neural network, or are convolutions—partially using output from previous iterations of applying the model as further input to produce results for the current input.

A machine learning model can be trained with supervised learning, where the training data includes network or device data associated with a time proximate to the occurrence of a network issue as input and a desired output, such as the cause of the network issue. A unique datapoint signature 302 including the input and the desired output can be provided as the training data to the model. Output from the model can be compared to the desired output, and based on the comparison, the model can be modified, such as by changing weights between nodes of the neural network or parameters of the functions used at each node in the neural network (e.g., applying a loss function). After applying each of the network or device factors in the training data and modifying the model in this manner, the model can be trained to evaluate new network issues.

The unique datapoint signature 302 is produced with data from both the user domain 310 and the network domain 320. The data from the network domain 320 describes the state of the network proximate to the occurrence of a network issue and can be derived from multiple nodes within the network. For example, the data from the network domain 320 can include timestamped CDRs. The time period associated with the data can begin minutes before occurrence or reporting of the issue, e.g., 1, 5, 10, 30, or 60 minutes prior. In some implementations, the time period can be expanded to being hours or days surrounding the occurrence of the network issue. The time period can vary depending on the nature of the issue and the available data, but it is preferably large enough to capture the circumstances of the network abnormality with enough detail, but not too large as to waste computing resources. Besides CDRs, nodes in the network can record events, warnings, and errors in various logs. The datapoint signature 302 can also be produced using data or metrics produced by network monitoring and analytics 322, such as network traces, key performance indicators (KPIs), packet captures (PCAPs). The data sources used to produce the datapoint signature 302 are further discussed below with reference to FIG. 4.

The information from the user domain 310 can include device logs from the user device 312. Furthermore, the user device 312 can initiate diagnostics such as speed tests by communicating with a third-party server 314, which are then included in the datapoint signature 302. For example, the user device can be connected to an existing speed test service, such as Ookla®. In some implementations, diagnostics can be performed by attempting to connect to a server of the network domain 320 instead of the third-party server 314. For example, diagnostic tests can be performed to test various aspects of the user device 312's connectivity, such as voice quality tests and short-messaging service (SMS) connectivity tests. If data connectivity is insufficient, results of the diagnostic tests can be uploaded from the user device 312 after connectivity is reestablished.

As described above, the unique datapoint signature 302 used to train the machine learning model 332 includes desired outputs corresponding to inputs comprising network or device information. When the input information indicates a state of the network or the user device 312 during occurrence of a network issue, then the desired outputs can be a cause of the network issue.

In some implementations, the desired outputs are labeled by customer feedback from the user device 312. The customer feedback can be received from the user device 312 via a mobile application executing on the user device 312. For example, the mobile application can be configured to report network issues to the network domain 320. Network data, such as CDRs, corresponding to a time period including the network issue is obtained. After an attempt to resolve the network issue, the mobile application can subsequently used to provide feedback relating to the network issue. For example, if a user indicates that resetting a home modem resolved the network issue, then the CDRs corresponding to the network issue can be labeled as being associated with a modem issue. In other examples, the customer feedback can indicate that voice quality is poor, or that a text message was delayed, and the corresponding datapoint signatures 302 are tagged with the corresponding target outputs. In addition to customer feedback, data can be labeled by employees of the network provider or by a third-party labeling service.

Once trained, the machine learning model 332 can be applied to new input data 304 to predict causes of network issues. The new input data 304 can be obtained from the same sources as the datapoint signature 302, except the new input data 304 is generally not labeled. For example, the input data can include CDRs, diagnostic results such as speed tests, KPIs, etc. The trained machine learning model 332 can predict the cause of network issues even if the new input data 304 includes fewer data fields or data points than the datapoint signature 302. Thus, less data needs to be collected to diagnose network abnormalities, improving overall efficiency. In addition, the system 300 can identify network issues more quickly and with less manual investigation. This allows issues to be resolved more quickly, improving network performance and customer satisfaction.

The predictions 306 produced by the trained machine learning model 332 can be compared to reference feedback to further refine the model 332. For example, the reference feedback can indicate how accurate a corresponding prediction was. Based on the feedback, a configuration of the machine learning model 332 is updated. For example, the configuration can include weights of a neural network, which can be updated to minimize error between predictions 306 and target outputs. In this manner, the machine learning model 332 is continually updated as it makes predictions and is provided feedback corresponding to the predictions. In some implementations, the reference feedback is provided to the machine learning model 332 from the mobile application of the user device 312 used to report the network issue. Alternatively, the feedback can be provided by a phone call or text from the customer, or by an employee of the network.

In some implementations, the configuration of the machine learning model 332 is manually adjustable, e.g., by a network engineer. Manual adjustment or retraining may be needed in cases of model drift. In some implementations, the machine learning model 332 can be optimized based on capital expenditures (CapEx) or operating expenses (OpEx), such as to maximize return on investment.

In some implementations, the prediction 306 produced by the machine learning model 332 includes a recommended action relating to the network issue, such as a corrective action. For example, the machine learning model 332 can recommend that the user restart or change a configuration of the user device 312. In some implementations, the machine learning model 332 produces a recommended action without identifying a single cause of the network issue. For example, a corrective action can be recommended that resolves several different network issues, or even an unknown issue.

The network can automatically perform an action recommended by the machine learning model 332. For instance, the network can be configured to trigger a corrective action upon receiving a recommendation from the machine learning system 330. In some implementations, the network automatically creates a support ticket based on a recommendation from the machine learning model 332. For example, a support ticket can be generated if the corrective action requires a network engineer to manually perform it. The content of the support ticket can indicate the predicted cause or a predicted network component that an engineer should investigate. In some implementations, the machine learning model 332 can predict a severity level of the network abnormality, for example to change a priority level of an existing support ticket. Performing automatic fixes or automatically creating tickets in response to the prediction by the machine learning model 332 improves performance of the network by minimizing potential downtime. In addition, network congestion is reduced compared to typical support systems, which rely on multiple channels of communication between customers, support agents, and engineers.

The trained machine learning model 332 can proactively detect network issue without any customer report from the user device 312. For example, the machine learning model 332 can be trained to identify network abnormalities based on data from the network monitoring and analytics 322. The network monitoring and analytics 322 provides real-time network performance data or metrics, such as network traces, PCAPs, an KPIs. Thus, the machine learning model 332 can ingest these data in real-time to identify network issues early. This enables the network to perform automatic fixes or create support tickets before customer experience is significantly affected.

In some implementations, the machine learning system 330 implements multiple machine learning models 332. The multiple machine learning models 332 can be configured to correspond to different network fix actions. For example, each machine learning model 332 can receive network log information or diagnostic results as input and predict whether or not a particular fix action is needed. That is, the machine learning model 332 can be a binary classification model. This multi-model binary classification approach can simplify the training process and reduce complexity of each of the individual machine learning models 332, compared to using a single machine learning model 332 to predict among many possible fixes.

Figure 4:
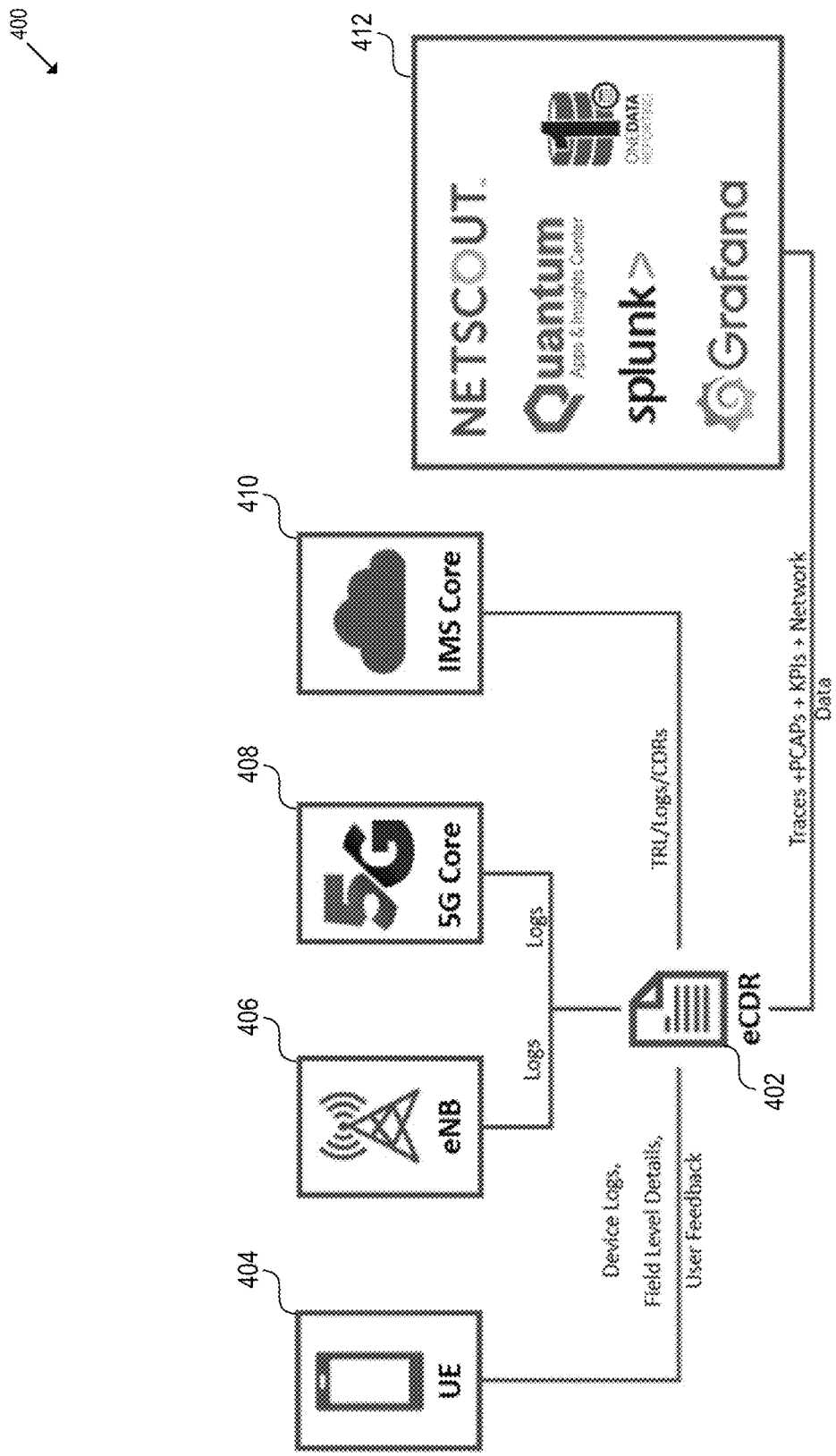
FIG. 4 is a block diagram that illustrates a system that includes multiple data sources.

FIG. 4 is a block diagram that illustrates a system 400 that includes multiple data sources. Information from the multiple data sources 404-412 are used to produce an enhanced CDR 402 ("eCDR"). The eCDR 402 can be used as the unique datapoint signature 302 of FIG. 3 to train a machine learning model, such as the machine learning model 332 of FIG. 3. Training a machine learning model using the combination of data from these disparate data sources 404-412 enables unique insights that cannot be otherwise obtained by analyzing these sources individually.

The user device 404 is similar to the user device 312 of FIG. 3 and can be a smartphone, computer, wearable device, IoT device, etc. The user device 404 can provide device logs that indicate the configuration of the device during a network issue. For example, the device logs can indicate service state, subscriber identity module (SIM) state, carrier, device software version, airplane mode status, reference signal received power (RSRP), reference signal received quality (RSRQ), 5G signal availability, and more. In addition, the user device 404 performs diagnostics such as speed tests, voice quality tests, or SMS tests. The results of the diagnostics are then recorded as device logs and used as a basis to produce the eCDR 402. Example diagnostic results include upload speed, download speed, latency, jitter, or power (e.g., as dBm).

Training the model with device logs can provide device-specific and field-level information that is not present in other network logs. For example, device logs from the user device 404 can include location information. Detailed location information can be derived from GPS, Wi-Fi, or Bluetooth sensors of the user device 404.

The machine learning model is trained to generate predictions about network issues based on the combination of location information and device information from the user device 404, along with network information from the other sources 406-412. For example, a first eCDR can indicate that a first customer uses a specific device in a specific region. If the first customer experiences a network issue, then the machine learning model can predict that a second eCDR associated with a second customer using the same device in the same area as the first customer can expect the same network experience given the similar conditions. In another example, a network issue that is strongly correlated with one area can be indicative of localized causes, such as weather.

Network logs are obtained from multiple nodes in the network, including a base station 406, a 5G core 408, and an IP Multimedia Subsystem (IMS) core 410. The network elements 406-410 can comprise the network domain 320 of FIG. 3 and be similar to corresponding elements described in FIGS. 1 and 2, such as the base stations 102 or the core network 106.

The 5G core 408 includes multiple core functions that can separately produce network logs. For example, the 5G core 408 can include the functions described in FIG. 2, such as the AMF, SMF, PCF, UDM, and HSS. Other nodes or functions that can be included in the 5G core 408 include a short message service function (SMSF) or a Mobility Management Entity (MME).

The IMS core 410 produces network logs including Transaction Record Logs (TRLs) and CDRs. Although CDRs are typically used for customer billing purposes, the CDRs from the IMS core 410 are enriched with additional information from the data sources 404-412 to produce the eCDR 402. As a result, the eCDR 402 includes additional information that can better train a machine learning model to identify network issues. Furthermore, by combining data from multiple sources, the same eCDR 402 can be used to train multiple machine learning models.

The IMS core 410 can include multiple functions or nodes that produce network logs, including a Session Border Gateway (SBG), Call Session Control Function (CSCF), Telephony Application Server (TAS), Breakout Gateway Control Function (BGCF), Media Resource Function (MRF), WebRTC Gateway (WRG), or Interconnect Session Border Controller (I-SBC). Note that although FIG. 4 illustrates a 5G core 408 and an IMS core 410, implementations of the present technology are not limited this particular architecture or to 5G.

The network monitoring and analytics 412 are similar to the network monitoring and analytics 322 of FIG. 3. The network monitoring and analytics 412 collect data within the network and produce metrics that are used to train the machine learning model. Example data and metrics include network traces, PCAPs, and KPIs. KPIs that can be used to train the model include access failure rates, user throughput, and traffic measurements (e.g., VOLTE Erlangs). The network monitoring and analytics 412 can include various software tools, such as those from Netscout, Quantum, Splunk, or Grafana.

In some implementations, trouble tickets or outage reports are also used to produce the eCDR 402. Trouble tickets can be generated by customer support in response to customer reporting of an issue or can be generated internally. For example, a trouble ticket can include a severity level or text describing the network issue, both of which can be included in the eCDR 402 to train the machine learning model.

Figure 5:
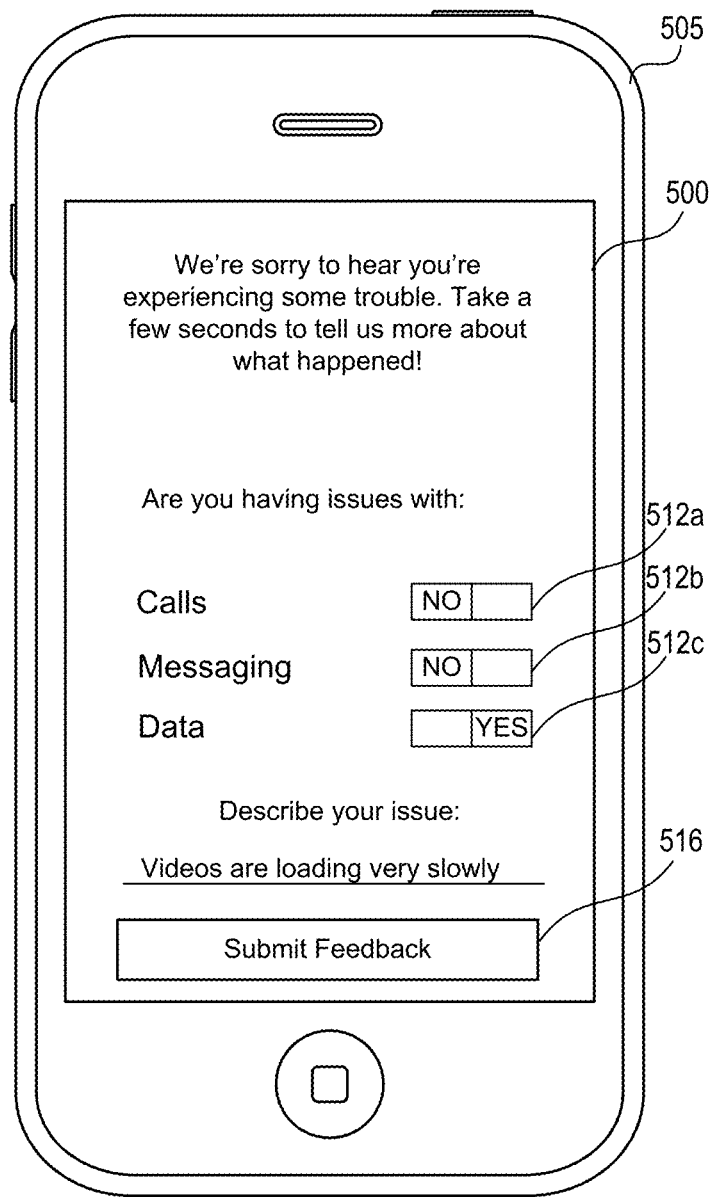
FIG. 5 illustrates a mobile application for reporting network issues.

FIG. 5 illustrates a mobile application 500 for reporting network issues. The mobile application 500 is executed on a user device 505, similar to the user devices 312 or 404 of FIGS. 3 and 4. As shown in FIG. 5, the mobile application 500 can be used to report network issues. The mobile application 500 includes a user interface 510 that simplifies the customer reporting process. Switches 512a-c enable a user to easily select the types of network issues they are experiencing such as call, messaging, or data issues. The user can provide more detailed information in the text region 414. When an input is received at the submit button 416, the report is transmitted to the network.

In some implementations, the mobile application 500 is configured to automatically trigger a diagnostic test upon an input to the submit button 516. Example diagnostic tests include speed tests, voice quality tests, and SMS tests. The diagnostic test can run in the background without further action from the user. In some implementations, the user can perform further input to initiate the diagnostic. Some diagnostic tests, such as speed tests, can require the user device 5 to communicate with a third-party server. Results of the diagnostic test can be transmitted to the user device 5 from the third-party server and then uploaded to a database of the network. In some implementations, the test results can be transmitted directly from the third-party server to the network.

In addition to triggering a diagnostic, an input to the submit button can cause the user device to collect device logs, Access Point Name (APN) configurations, or other device information and subsequently transmit the collected information to the network for analysis by a machine learning model. In some implementations, a single input to the submit button can trigger the user device 505 to collect device logs, perform diagnostics, and transmit all the information to the network. Configuring the user interface 510 with a "one-click" submit button 516 increases usability of the user interface 510 and simplifies the reporting process for the user. This increases the likelihood that network abnormalities and relevant information relating to the circumstances surrounding the abnormalities are reported. As a result, network abnormalities can be identified and resolved more quickly, improving overall network performance and customer satisfaction.

The mobile application 500 can further be used to transmit feedback relating to resolution of a network issue. After the device information submitted through the mobile application 500, the information is used by a machine-learning model to predict a cause of the network issue or to trigger a fix action. The user can then submit feedback through the mobile application 500 indicating the effectiveness of the fix action or the accuracy of the predicted cause. For example, the feedback can be in the form of a comment or in the form of a numerical score (e.g., 1 to 10, 5 stars, thumbs up/down, etc.) The feedback is then used to update the machine learning model.

Figure 6:
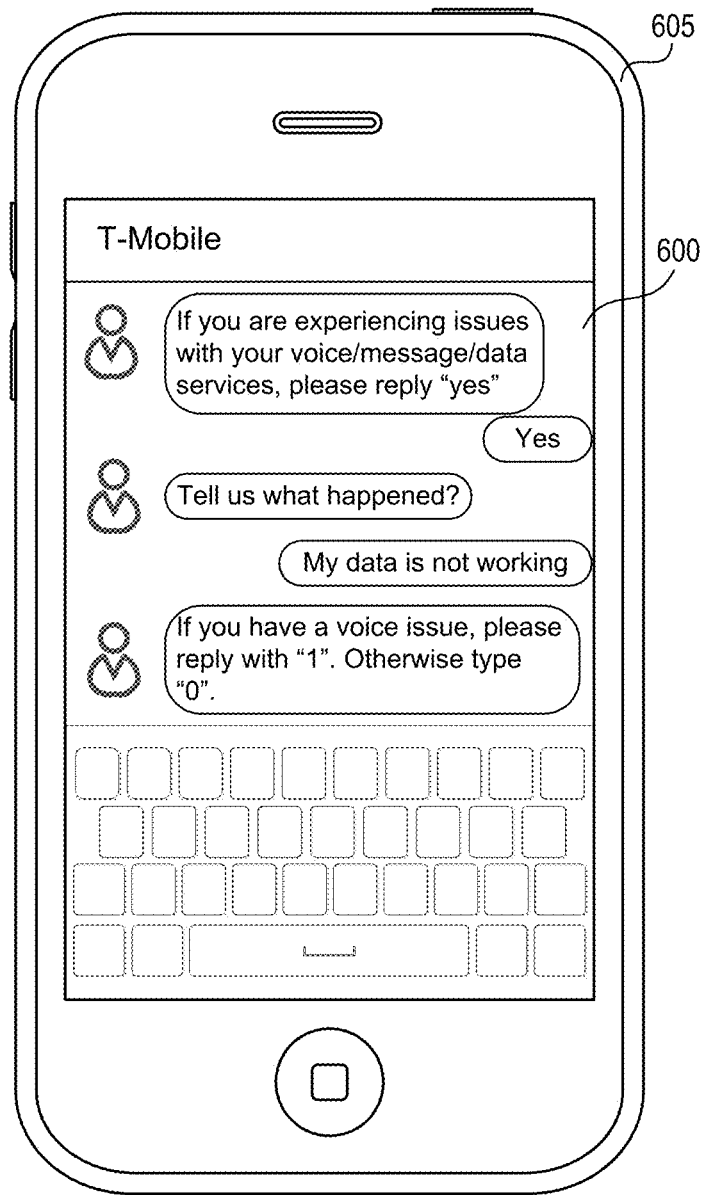
FIG. 6 illustrates a text messaging application for reporting network issues.

FIG. 6 illustrates a text messaging application 600 for reporting network issues. The text messaging application 600 can be an SMS application or other chat application executing on a user device 605 (e.g., iMessage, WhatsApp, etc.) Thus, the text messaging application 600 can be used to report network issues without needing to download an additional application, such as the mobile application 500 of FIG. 5. A user can communicate with an automated agent, which can be configured with an adaptive messaging flow designed to elicit further detail regarding the network issue. The messages sent by the user device 605 are parsed and converted into information usable by a machine learning model to inform predictions.

In some implementations, the user device 605 initiates a diagnostic test from the text messaging application 600. For example, the automated agent can send a link to an external website hosted by a third-party, where the user performs the diagnostic test. The test results are then transmitted from the third-party to the network for use by the machine learning model. In addition, the user device 605 can test for messaging issues directly from the text messaging application 600. For example, the network can transmit a message with a known timestamp to the user device 605. The user device 605's response can then indicate whether or not the message was delayed by the received timestamp.

Figure 7:
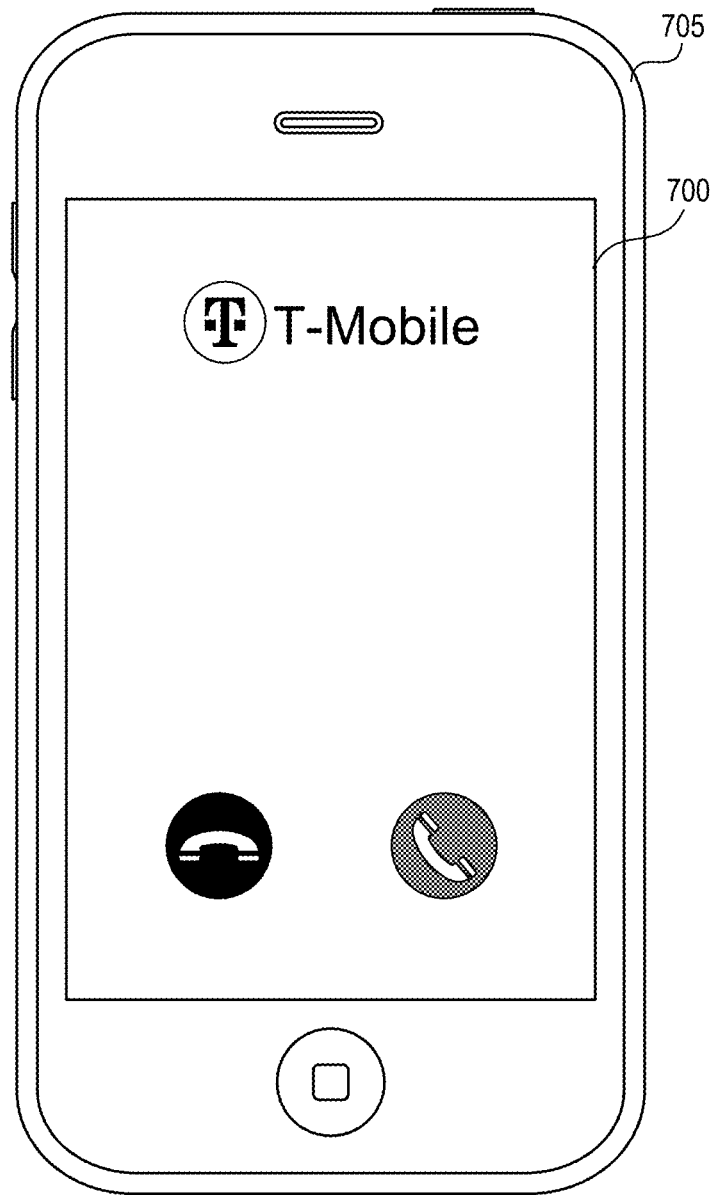
FIG. 7 illustrates a voice calling application for reporting network issues.

FIG. 7 illustrates a voice calling application 700 for reporting network issues. The voice calling application 700 can be the default phone application of a user device 705 or other suitable application. To provide information, a user can dial a keypad in response to voice prompts. For example, the user can be prompted to dial "1" to report a data issue, "2" to report a voice issue, and "3" to report a messaging issue. Alternatively, the user can speak directly to an automated agent that is configured to recognize speech. User speech can be transcribed into a text format prior to analysis with by the machine learning model.

In some implementations, the network collects audio samples while a user reports a network issue using the voice calling application 700. The audio samples are then processed to determine voice quality. The voice quality can then be used by a machine learning model to determine the cause of the network issue. For example, low voice quality combined with good network connectivity metrics can indicate that the user device 705 has a microphone issue.

The voice calling application can also be used when training the machine learning model. For example, if an audio sample with "poor" voice quality is used to label a corresponding eCDR, the model can be trained to associate similar eCDRs with poor voice quality.

Figure 8:
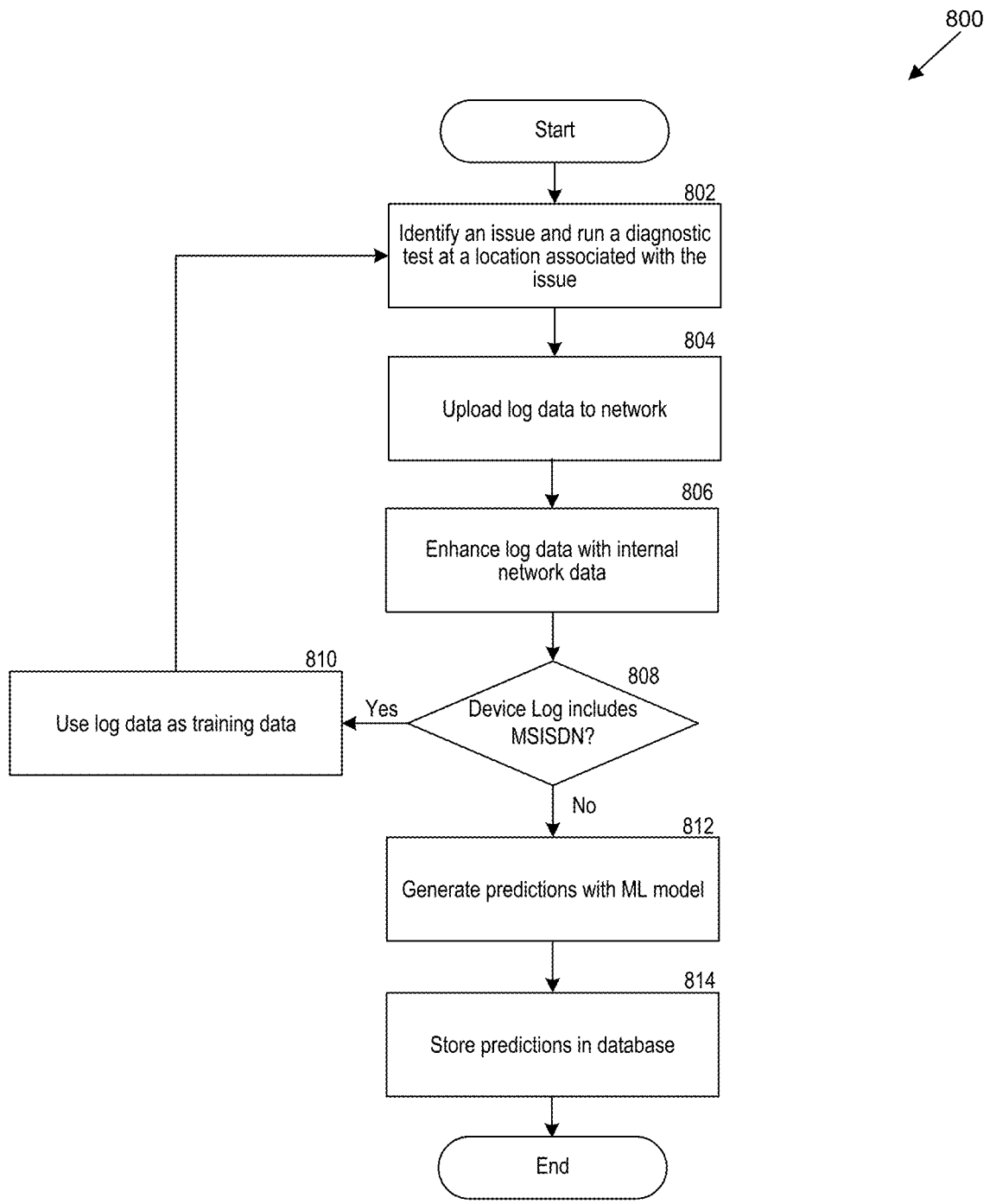
FIG. 8 is a flowchart that illustrates a process for training and implementing a machine learning model to predict network issues.

FIG. 8 is a flowchart that illustrates a process 800 for training and implementing a machine learning model to predict network issues. At 802, an issue is identified by a customer or network engineer. A diagnostic test is performed by a user device to produce a device log. At 804, the device log is uploaded to the network by a mobile application. At 806, the device log is enhanced with data from internal network systems. For instance, the internal network systems can enrich the device log with CDRs, KPIs, PCAPs, or network traces.

At 808, a determination is made as to whether the device log includes a particular network identifier, such as an MSISDN, an International Mobile Subscriber Identity (IMSI), or a Call-ID. Identifiers such as an MSISDN, IMSI, or Call-ID are traceable throughout the network. This enables network logs from different network elements to be correlated by a common identifier, providing a more complete picture of each subscriber's network experience. If so, then at 810, the enhanced device log is used as training data. The device log is labeled with the known cause of the network issue identified at 802. Steps 802-810 are repeated until the machine learning model has been trained on enough data.

If the device log does not include the particular network identifier at 808, then at 812, the model is applied to the device log to generate predictions or recommend actions. For example, the model can indicate "increase an existing trouble ticket from priority 4 to priority 1," "create a new trouble ticket," record customer issue as lack of home coverage," or record customer issue backhaul impairment." In some implementations, the machine learning model is a binary classification model. At 814, the predictions generated by the model are stored in a database.

Figure 9:
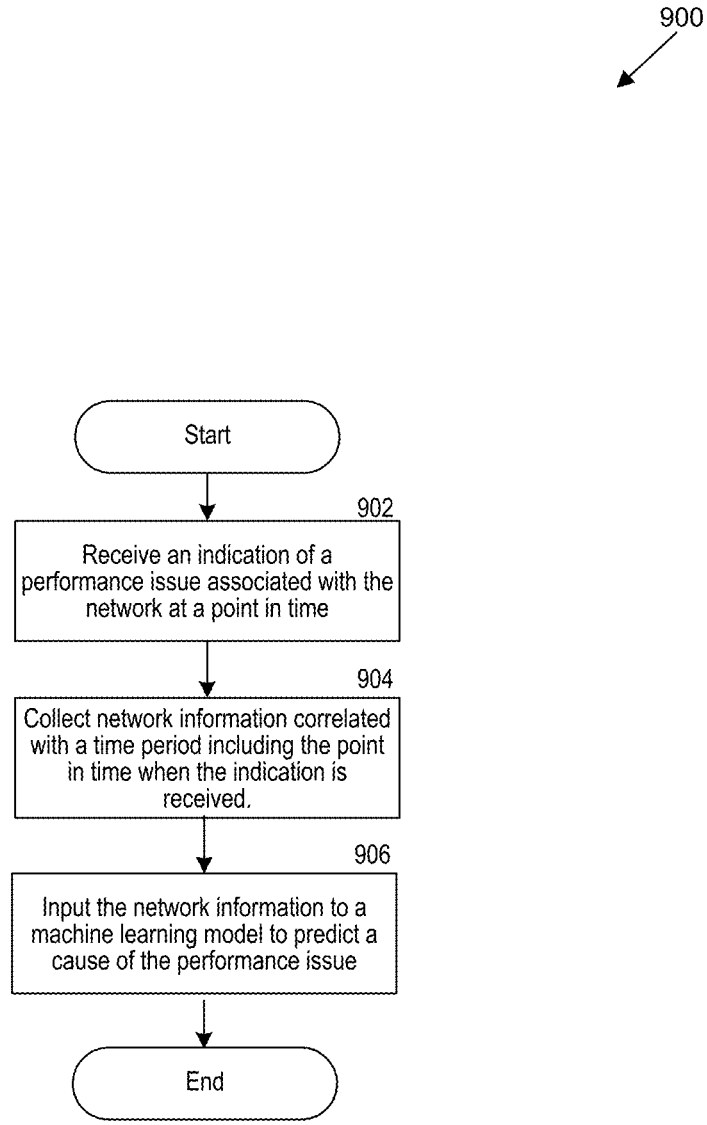
FIG. 9 is a flowchart that illustrates a process for facilitating training of a machine learning model.

FIG. 9 is a flowchart that illustrates a process 900 that uses a machine learning model to predict a cause of a performance issue. For example, the process can use the machine learning model 332 of FIG. 3. At 902, an indication of a performance issue associated with a network is received from a user device. The performance issue can be a network abnormality or issue with the user device itself. The indication is received at a point in time. At 904, network information is collected that is correlated with a time period including the point in time when the indication is received. The network information is at least partially derived from a call detail record (CDR). In some implementations, the network information includes a key performance indicator (KPI), a network trace, or a packet capture (PCAP), such as those produced by network monitoring and analytics 412 of FIG. 4.

At 906, the network information is input to a machine learning model to predict a cause of the performance issue. When the performance issue due to a network fault, the prediction can cause the network to automatically perform a fix action or create a support or trouble ticket. For example, the prediction can include a severity level of a cell site associated with the performance issue. If a ticket already exists for that cell site indicating a lower severity level, then the new ticket can increase the severity level to ensure that the issue is prioritized.

In some implementations, the machine learning model is trained by providing multiple input CDRs and multiple target predictions corresponding to the multiple input CDRs to the machine learning model. These multiple target predictions are based on customer feedback relating to performance of the network. The machine learning model is applied to the multiple input CDRs to generate multiple output predictions corresponding to the multiple input CDRs. A configuration of the machine learning model is then adjusted based on the multiple output predictions and the multiple target predictions. For example, a large difference between the output predictions the target predictions can cause a larger adjustment of the model's weights than a smaller difference.

In some implementations, the machine learning model at 906 is continuously updated as it generates predictions and receives feedback on those predictions. An example process is as follows: The prediction of the cause from 906 is displayed on the user device. The feedback associated with the prediction of the cause is received from the user device, and a target prediction based on the feedback is provided to the machine learning model. Based on the prediction and the target predictions, a configuration of the machine learning model is updated. The updating process can be performed according to a set schedule, such as daily, weekly, or monthly.

In some implementations, the user device performs a diagnostic procedure. For example, the results of the diagnostic procedure can include a speed, a latency, or a jitter. The network information at 904 is augmented with the results of the diagnostic procedure, which can then affect the model's prediction at 906. In some implementations, the diagnostic procedure is performed in response to a user-input to a mobile application executing on the user device. For example, the user input can be a single input to the submit button 516 of FIG. 5.

Computer System

Figure 10:
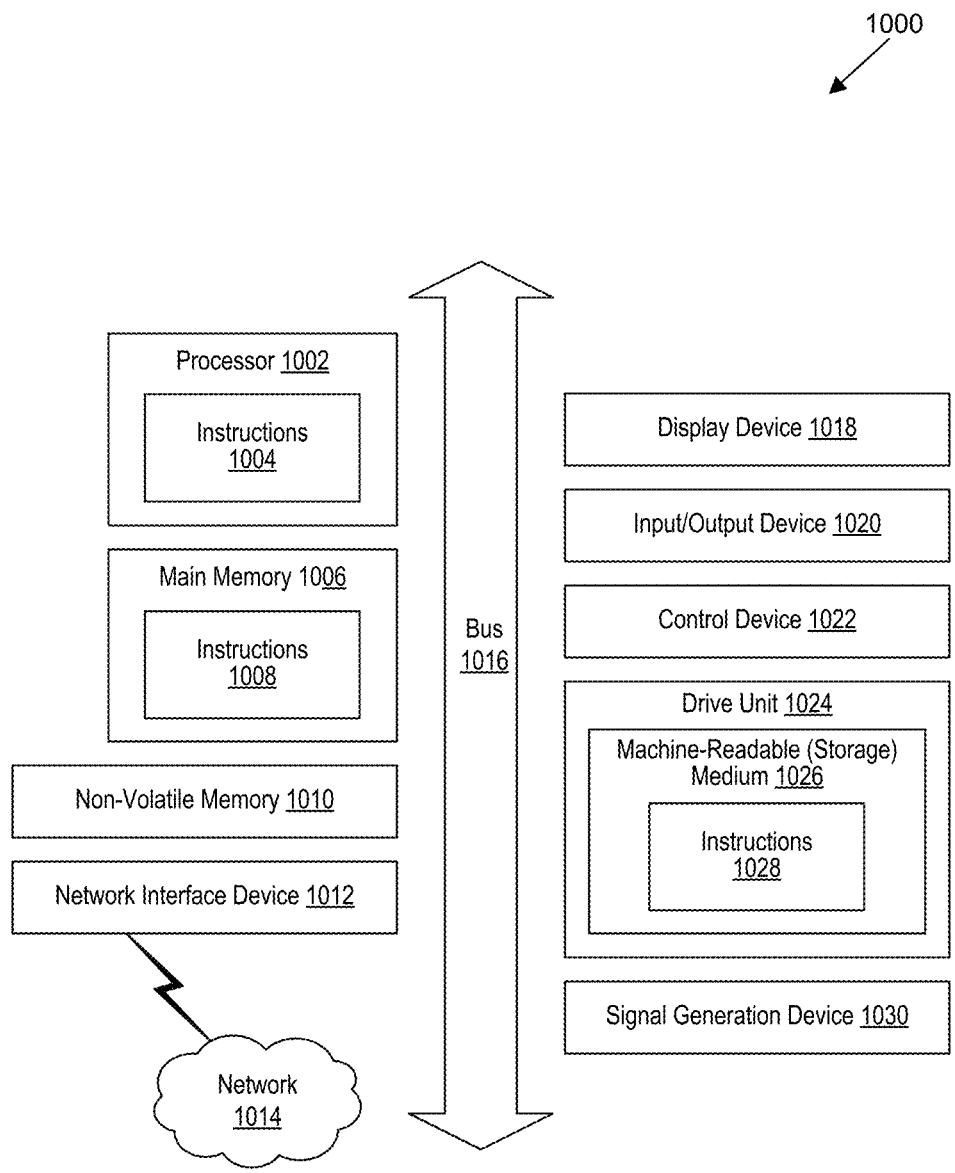
FIG. 10 is a block diagram that illustrates an example of a computer system in which at least some operations described herein can be implemented.

FIG. 10 is a block diagram that illustrates an example of a computer system 1000 in which at least some operations described herein can be implemented. As shown, the computer system 1000 can include: one or more processors 1002, main memory 1006, non-volatile memory 1010, a network interface device 1012, video display device 1018, an input/output device 1020, a control device 1022 (e.g., keyboard and pointing device), a drive unit 1024 that includes a storage medium 1026, and a signal generation device 1030 that are communicatively connected to a bus 1016. The bus 1016 represents one or more physical buses and/or point-to-point connections that are connected by appropriate bridges, adapters, or controllers. Various common components (e.g., cache memory) are omitted from FIG. 10 for brevity. Instead, the computer system 1000 is intended to illustrate a hardware device on which components illustrated or described relative to the examples of the figures and any other components described in this specification can be implemented.

The computer system 1000 can take any suitable physical form. For example, the computing system 1000 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 1000. In some implementation, the computer system 1000 can be an embedded computer system, a system-on-chip (SOC), a single-board computer system (SBC) or a distributed system such as a mesh of computer systems or include one or more cloud components in one or more networks. Where appropriate, one or more computer systems 1000 can perform operations in real-time, near real-time, or in batch mode.

The network interface device 1012 enables the computing system 1000 to mediate data in a network 1014 with an entity that is external to the computing system 1000 through any communication protocol supported by the computing system 1000 and the external entity. Examples of the network interface device 1012 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 1006, non-volatile memory 1010, machine-readable medium 1026) can be local, remote, or distributed. Although shown as a single medium, the machine-readable medium 1026 can include multiple media (e.g., a centralized/distributed database and/or associated caches and servers) that store one or more sets of instructions 1028. The machine-readable (storage) medium 1026 can include any medium that is capable of storing, encoding, or carrying a set of instructions for execution by the computing system 1000. The machine-readable medium 1026 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 1010, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 1004, 1008, 1028) set at various times in various memory and storage devices in computing device(s). When read and executed by the processor 1002, the instruction(s) cause the computing system 1000 to perform operations to execute elements involving the various aspects of the disclosure.

Remarks

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

We claim:

1. A system for diagnosing issues in a telecommunications network comprising:
   at least one hardware processor; and
   at least one non-transitory memory storing instructions, which, when executed by the at least one hardware processor, cause the system to:
   receive an indication of a performance issue affecting a wireless device,
      wherein the indication is reported from the wireless device at a point in time in response to a user-input to a mobile application executing on the wireless device;
   in response to the indication of the performance issue, cause the wireless device to perform a diagnostic test;
   receive test result data of the diagnostic test performed at the wireless device;
   correlate the test result data with a call detail record (CDR) recorded by a core network node of the telecommunications network that spans a time period including the point in time when the indication of the performance issue was reported;

cause a machine learning model to generate a prediction of a cause of the performance issue based on the CDR correlated with the test result data, wherein the machine learning model is trained to diagnose performance issues of the telecommunications network or the wireless device based on a set of unique datapoint signatures labeled with respective causes of respective performance issues, wherein each of the unique datapoint signatures correspond to a respective wireless device experiencing the respective performance issue, wherein each of the unique datapoint signatures comprise a device log collected from a diagnostic test of the respective wireless device performed by a third-party service and correlated, based on a network identifier of the respective wireless device, with a respective CDR of the respective wireless device, wherein the network identifier is included within the device log, wherein the respective CDR of the respective wireless device is contemporaneous with a respective time period that includes a time in which the respective wireless device experienced the respective performance issue, and wherein the network identifier is traceable throughout the telecommunications network to identify activity of the respective wireless device.

2. The system of claim 1 further caused to:
receive, from the wireless device, feedback from the mobile application relating to the generated prediction;
provide the feedback to the machine learning model; and
update a configuration of the machine learning model based on the feedback and the prediction.

3. The system of claim 1 further caused to:
correct the performance issue or generate a support ticket based on the performance issue.

4. The system of claim 1 caused to, prior to the CDR being obtained:
obtain multiple CDRs from a first core network node of the telecommunications network;
modify the multiple CDRs
to include additional network information obtained from multiple data sources associated with the telecommunications network other than the first core network node; and
cause the machine learning model to generate the prediction of the cause of the performance issue based on the modified multiple CDRs.

5. The system of claim 4, wherein the additional network information includes an additional device log from the wireless device and at least one of: a Key Performance Indicator (KPI), a network trace, or a packet capture (PCAP).

6. The system of claim 1 further caused to:
in response to receiving the indication of the performance issue, cause the wireless device to perform a diagnostic test; and
provide a result of the diagnostic test to the machine learning model.

7. The system of claim 1, wherein the machine learning model is a first model of multiple machine learning models each configured to perform binary classification, the system further caused to:
cause a second model of the multiple machine learning models to generate an additional prediction of the cause of the network issue based on the CDR.

8. A non-transitory computer-readable storage medium storing instructions, which, when executed by a data processor of a system, cause the system to:
receive, from a user device over a network, an indication of a performance issue associated with the network, wherein the indication is received at a point in time;
collect network information correlated with a time period including the point in time when the indication is received,
wherein the network information is at least partially derived from a call detail record (CDR); and
input the network information to a machine learning model to predict a cause of the performance issue;
wherein the machine learning model is trained to diagnose performance issues of the network or the user device based on a set of unique datapoint signatures labeled with respective performance issues and respective causes of the respective performance issues,
wherein each of the unique datapoint signatures correspond to a respective user device experiencing the respective performance issue,
wherein each of the unique datapoint signatures comprise a device log collected from a diagnostic test of the respective user device performed by a third-party service and correlated, based on a network identifier of the respective user device, with a CDR of the respective user device,
wherein the network identifier is included within the device log,
wherein the CDR of the respective user device is contemporaneous with a respective time period that includes a time in which the respective user device experienced the respective performance issue, and
wherein the network identifier is traceable throughout the network to identify activity of the respective user device.

9. The non-transitory computer-readable storage medium of claim 8, wherein the machine learning model is trained by causing the system to:
provide multiple input CDRs and multiple target predictions corresponding to the multiple input CDRs to the machine learning model,
wherein the multiple target predictions are based on customer feedback relating to performance of the network;
apply the machine learning model to the multiple input CDRs, thereby generating multiple output predictions corresponding to the multiple input CDRs; and
adjust a configuration of the machine learning model based on the multiple output predictions and the multiple target predictions.

10. The non-transitory computer-readable storage medium of claim 8, wherein the system is further caused to:
in response to receiving the indication of the performance issue, cause the user device to perform a diagnostic procedure; and
augment the network information with results of the diagnostic procedure.

11. The non-transitory computer-readable storage medium of claim 10, wherein the results of the diagnostic procedure include a speed, a latency, or a jitter.

12. The non-transitory computer-readable storage medium of claim 10, wherein the diagnostic procedure is performed in response to a user-input to a mobile application executing on the user device.

13. The non-transitory computer-readable storage medium of claim 8, wherein the system is further caused to:
   cause display of the prediction of the cause on the user device;
   receive feedback associated with the prediction of the cause from the user device;
   provide a target prediction based on the feedback to the machine learning model; and
   update a configuration of the machine learning model based on the prediction and the target prediction.

14. The non-transitory computer-readable storage medium of claim 8, wherein the prediction includes a severity level of a cell site associated with the performance issue.

15. The non-transitory computer-readable storage medium of claim 8, wherein the network information further includes a key performance indicator (KPI), a network trace, or a packet capture (PCAP).

\* \* \* \* \*